US007408432B2

(12) United States Patent
Shi

(10) Patent No.: US 7,408,432 B2
(45) Date of Patent: Aug. 5, 2008

(54) RECEPTACLE TYPE GROUND-FAULT CIRCUIT INTERRUPTER

(75) Inventor: Jie Shi, Henan (CN)

(73) Assignee: Wenzhou Yongtai Electric Co., Ltd (CN)

( * ) Notice: Subject to any disclaimer, the term of this patent is extended or adjusted under 35 U.S.C. 154(b) by 163 days.

(21) Appl. No.: 11/410,657

(22) Filed: Apr. 25, 2006

(65) Prior Publication Data

US 2007/0188276 A1 Aug. 16, 2007

(30) Foreign Application Priority Data

Feb. 15, 2006 (CN) ........................ 2006 1 0023949

(51) Int. Cl.
*H01H 77/00* (2006.01)
*H01H 75/00* (2006.01)
*H02H 3/00* (2006.01)

(52) U.S. Cl. ................................ 335/17; 335/6; 361/42

(58) Field of Classification Search ..................... 335/6, 335/18, 17; 336/42, 72, 617, 633; 439/109, 439/110, 113, 134; 361/91.1, 93.1, 1; 307/39, 307/86, 97, 328, 116
See application file for complete search history.

(56) References Cited

U.S. PATENT DOCUMENTS

| | | | | |
|---|---|---|---|---|
| 6,944,001 | B2 * | 9/2005 | Ziegler et al. | 361/42 |
| 2004/0141264 | A1 * | 7/2004 | Germain et al. | 361/42 |
| 2004/0184207 | A1 * | 9/2004 | DiSalvo et al. | 361/42 |

* cited by examiner

*Primary Examiner*—George Nguyen
*Assistant Examiner*—Alexander Talpalatskiy
(74) *Attorney, Agent, or Firm*—Chen Yoshimura LLP

(57) ABSTRACT

A receptacle type ground-fault circuit interrupter (GFCI) device adapted for connecting to input lines, which includes a pair of input terminals for connecting to the input lines, a pair of receptacle outlets, a ground-fault current detector for detecting a ground fault condition on the input lines, a reset and trip device, and a self detecting and testing structure. The device further includes a normal working condition indicator and an end-of-life indicator. When the GFCI device is correctly wired and working properly, the device can be properly reset by a reset button. When the ground-fault is detected, the GFCI is put in a normal tripped state with no power output. When the input terminals and the output terminals are reversely wired, no power is output. If an input line is broken, no power is output.

8 Claims, 7 Drawing Sheets

RECEPTACLE TYPE GROUND-FAULT CIRCUIT INTERRUPTER

BACKGROUND OF THE INVENTION

1. Field of the Invention

This invention relates to a receptacle type ground-fault circuit interrupter.

2. Description of the Related Art

Conventional receptacle type reground-fault circuit interrupter (GFCI) device typically includes a faceplate, a middle frame, a bottom case, a grounding frame assembly, input terminals, output terminals, copper outlets, a ground-fault current detector, a reset and trip device, a reset button assembly and a test button assembly. The input terminals and copper outlets are integrally made and electrically connected. The reset and trip device includes an electromagnetic coil, an iron core, dynamic contact sheets, static contact sheets, a dynamic contact bridge, an L-shape retaining plate, reverse dynamic contact sheets and reverse static contact sheets. The reset button assembly includes a reset button, a button shaft and a reset spring, where one end of the button shaft has a thin shaft with a convex stage. The long edge of the L-type retaining plate has a through-hole and is inserted into an insertion hole in the horizontal direction of the dynamic contact bridge. The reverse dynamic contact sheets and the pair of reverse static contact sheets are on the lower side of the dynamic contact bridge.

Conventional GFCI devices of this structure have the following shortcomings. a) The reset button can reset the GFCI when the input and output terminals of GFCI are correctly wired, and cannot reset it when the terminals are reversely wired, thereby indicating that there is a mistake with the wiring. However, although it provides certain degree of reverse-wiring protection by preventing the reset, it only provides an indicating, and the output terminals are still powered and thus the user is still in danger of electrical shock. b) If a wire of the input terminal breaks or falls off from the input conductors when the GFCI is in normal use, the GFCI will not trip automatically, and thus remains in the reset state. There would be no great harm if it is a phase line that is broken or loose, but if it is the neutral line that is broken or loose, the electric potential at the output terminal or the copper outlets is equal to that of the input terminal, which will form an electric path through a human body. If a person gets electric shock on the copper outlets or the output terminal in this instance, the GFCI will not provide a protection function. c) There is no indication when the GFCI is damaged, causing users to continue to use it without being aware of the defect, therefore exposing themselves to the danger of electrical shock.

SUMMARY OF THE INVENTION

To solve various problems with conventional GFCI devices, the present invention provides an improved GFCI having a simple structure and is safer to use.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a receptacle type ground-fault circuit interrupter device adapted for connecting to input lines, which includes: a pair of input terminals for connecting to the input lines; a pair of receptacle outlets; a ground-fault current detector for detecting a ground fault condition on the input lines; a reset and trip device; and a self detecting and testing structure. The reset and trip device includes: a reset button assembly; an electromagnetic coil; an electromagnetic coil control circuit for controlling the electromagnetic coil, the electromagnetic coil control circuit being connected to the input terminals and being closed by the reset button assembly and opened by the ground-fault current detector; a moveable iron core disposed within the electromagnetic coil; a pair of static contact tips electrically connected to the receptacle outlets; a pair of elastic moveable contact sheets mechanically coupled to the moveable iron core and correspondingly disposed adjacent the pair of static contact tips, the pair of elastic moveable contact sheets being electrically connected to the pair of input terminals, respectively, via the ground-fault current detector; and a pair of moveable contact tips disposed on the pair of elastic moveable contact sheets and moveable to make and break contact with the pair of static contact tips. The self detecting and testing structure includes: a test button assembly; a light emitting diode; a ganged switch being controlled to close by the test button assembly and to open by the reset button assembly; an end-of-life indicator, wherein the light emitting diode, the ganged switch and end-of-life indicator are connected in series to form a simulated ground-fault loop; and a fault self-detecting control circuit including a photosensitive resistor optically coupled to the light emitting diode, the fault self-detecting control circuit being operable to open the electromagnetic coil control circuit.

It is to be understood that both the foregoing general description and the following detailed description are exemplary and explanatory and are intended to provide further explanation of the invention as claimed.

DETAILED DESCRIPTION OF THE PREFERRED EMBODIMENTS

A receptacle type GFCI device according to an embodiment of the present invention is described with reference to FIGS. 1 to 7. The GFCI device includes a shell formed with a faceplate 1, a middle frame 2 and a bottom case 3. The structures mounted within the shell include input terminals 31A and 31B, output terminals 34A and 34B, receptacle outlets 18A, 18B, 19A and 19B, a ground-fault current detector, a reset and trip structure and a self-detecting and testing structure.

Figure 5:
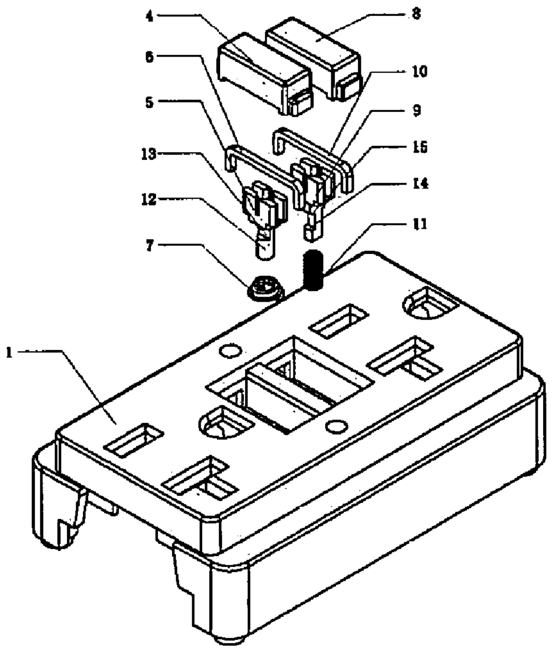
FIG. 5 is a partial exploded view of the faceplate portion of the GFCI shown in FIG. 1.

As shown in FIG. 5, the faceplate portion consists of a faceplate 1, a reset button assembly and a test button assembly. The reset button assembly includes a reset button 4, a reset button accessory 5, a reset short-circuit conductor 6 made of copper, and a reset spring 7. The reset short-circuit conductor 6 is mounted inside of the reset button accessory 5. The reset button accessory 5 is fixed on the lower side of the reset button 4 and connected with a ganged switch rod 12 on the lower side of it. A notch is formed on the upper side of the ganged switch rod 12. The reset spring 7 is located at the lower side of the reset button accessory 5. When a downward force is applied to the reset button 4, the reset button accessory 5 and the short-circuit conductor 6 move downward together to compress the reset spring 7. The two ends of the reset short-circuit conductor 6 contact two electrical contact points, which correspond to points A and B in the circuit diagram in FIG. 8, on a secondary circuit board 24 on the lower side of it to trigger the ground-fault interrupter to reset. After the force is released, the reset spring 7 will push the reset button assembly and reset short-circuit conductor 6 to return to the original positions.

The test button assembly includes a test button 8, a test button accessory 9, a test short-circuit conductor 10 made of copper, and a test spring 11. The test short-circuit conductor 10 is mounted inside of the test button accessory 9. The test button accessory 9 is fixed on the lower side of the test button 8 and is connected to a switch push rod 14 on the lower side of it. The upper side of the switch push rod 14 has an inclined surface 15. When a downward force is applied to the test button 8, the test button accessory 9 and the short-circuit conductor 10 move downward together to compress the test spring 11. The two ends of the test short-circuit conductor 10 contact the electric points, which correspond to points C and D in the circuit diagram in FIG. 8, on the secondary circuit board 24 on the lower side of it to perform a simulated detection on the ground-fault function of the GFCI. After the force is released, the test spring 11 will push the test button assembly 8 and test short-circuit conductor 9 to return to the original positions.

Figure 6:
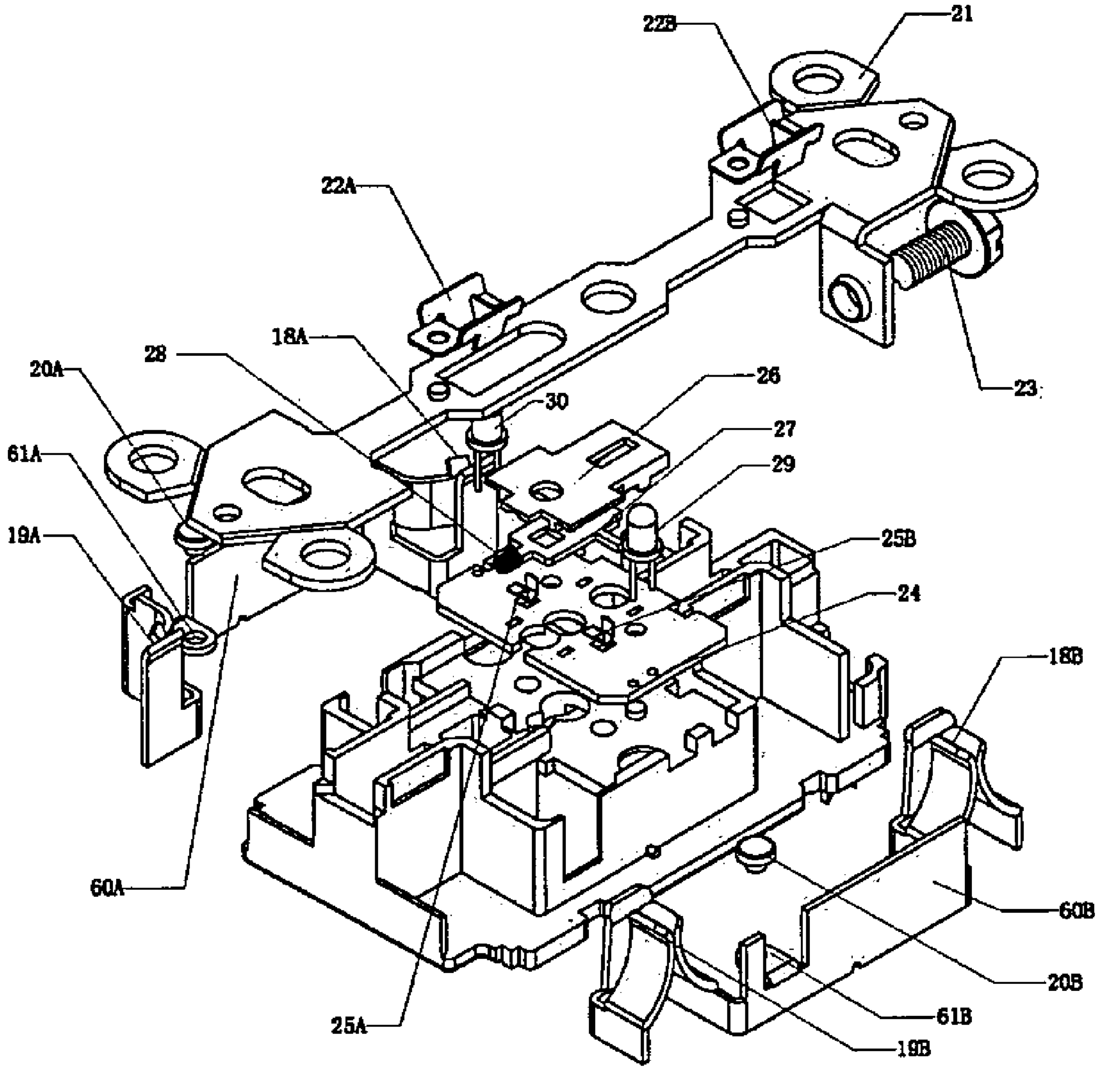
FIG. 6 is an exploded view of the middle frame of the GFCI shown in FIG. 1.
Figure 8:
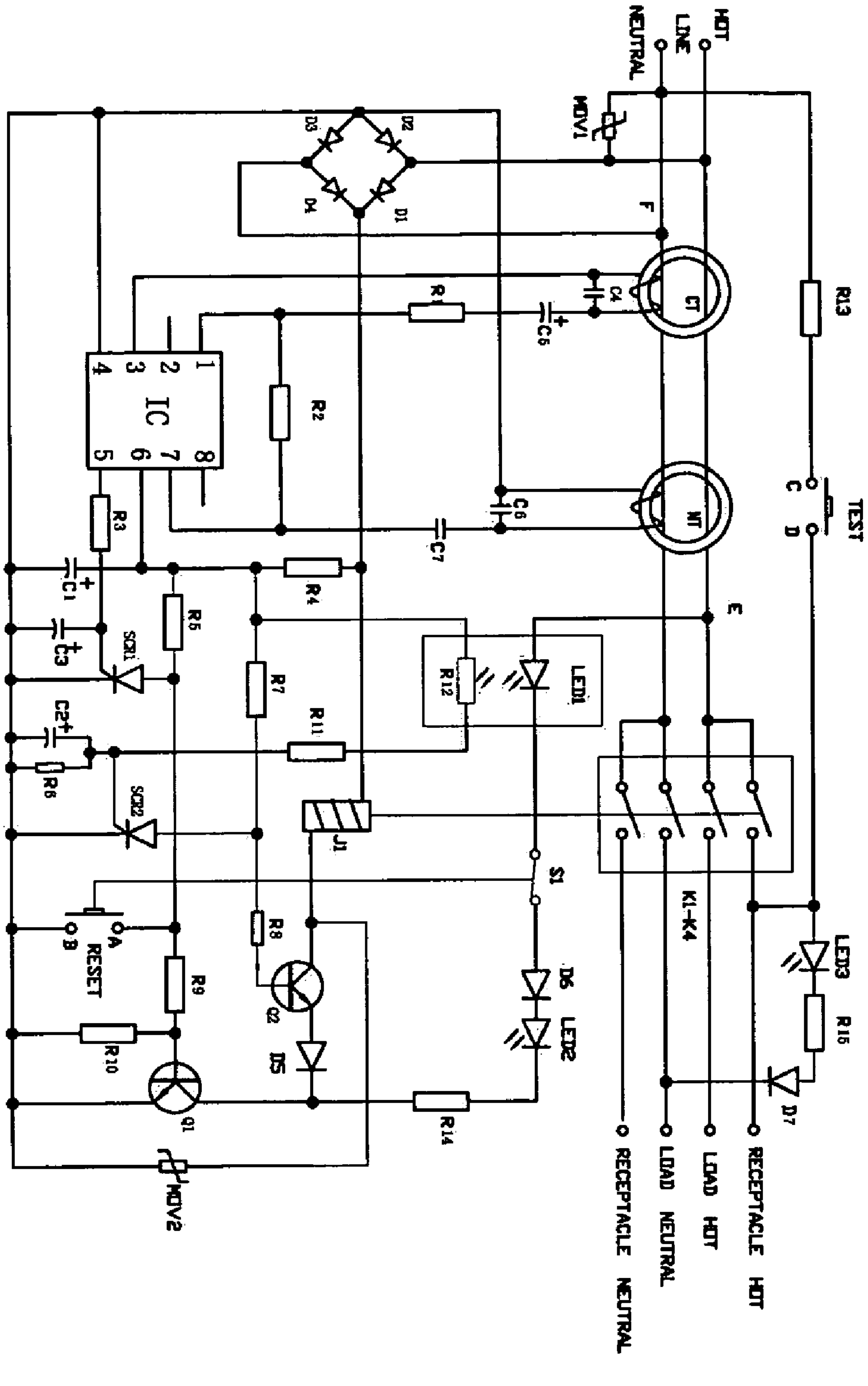
FIG. 8 is a circuit diagram of a receptacle type GFCI according to an embodiment of the present invention.

As shown in FIG. 6, the middle frame portion consists of a middle frame 2, receptacle conductors 60A and 60B made of copper, static contact tips 20A and 20B made of silver, a grounding stand 21, grounding blades 22A and 22B, a grounding screw 23, a secondary circuit board 24, a normal working condition indicator 29 and a self detecting and testing structure. The receptacle conductor 60A includes receptacle outlets 18A and 19A and a receptacle connecting contact 61A. The receptacle conductor 60B includes receptacle outlets 18B and 19B and a receptacle connecting contact 61B. The static contact tips 20A and 20B are riveted on the receptacle connecting contacts 61A and 61B. The self-detecting and testing structure includes a test button assembly, a reset button assembly, a light emitting diode, a ganged switch, an end-of-life indicator 30 and a fault self-detecting control circuit. The ganged switch is controlled to close by the test button assembly and controlled to open by the reset button assembly. The light emitting diode, the ganged switch and the end-of-life indicator 30 are connected in series with each other to form a simulated ground-fault loop. The fault self-detecting control circuit (as shown in FIG. 8) contains a photosensitive resistor optically coupled to the light emitting diode. The fault self-detecting control circuit controls the opening of the control circuit of an electromagnetic coil.

The ganged switch includes static contact spring sheets 25A and 25B, a rail 26, a sliding sheet 27 and a support spring 28. The sliding sheet 27 is slidably mounted on the rail 26, and has a through hole 16 corresponding to the ganged switch rod 12 of the reset button accessory. The sliding sheet 27 is pushed by the support spring 28 on the side near the reset button 4, and is disposed against the inclined surface 15 of the switch push-rod of the test button accessory 9 on the side corresponding to the test button 8. The sliding sheet 27 also has a connecting arm 17 at the center that cooperates with the two static contact spring sheets 25A, 25B to provide conductivity. The grounding stand 21 is fixed on the middle frame 2 and presses against the upper surface of the rail 26 so as to ensure that the rail 26 and the parts fixed on it do not move freely. The grounding blades 22A and 22B are riveted to the grounding stand 21 through two riveting lips on the stand 21. The grounding screw 23 is threaded into a thread hole on the stand 21. The secondary circuit board 24 is fixed on the middle frame 2 via positioning holes and is electrically connected to a main circuit board 39 by conductors. The static contact spring sheets 25A and 25B are welded on two welding points on the secondary circuit board 24 and the rail 26 is fixed on the circuit board 24.

Figure 1:
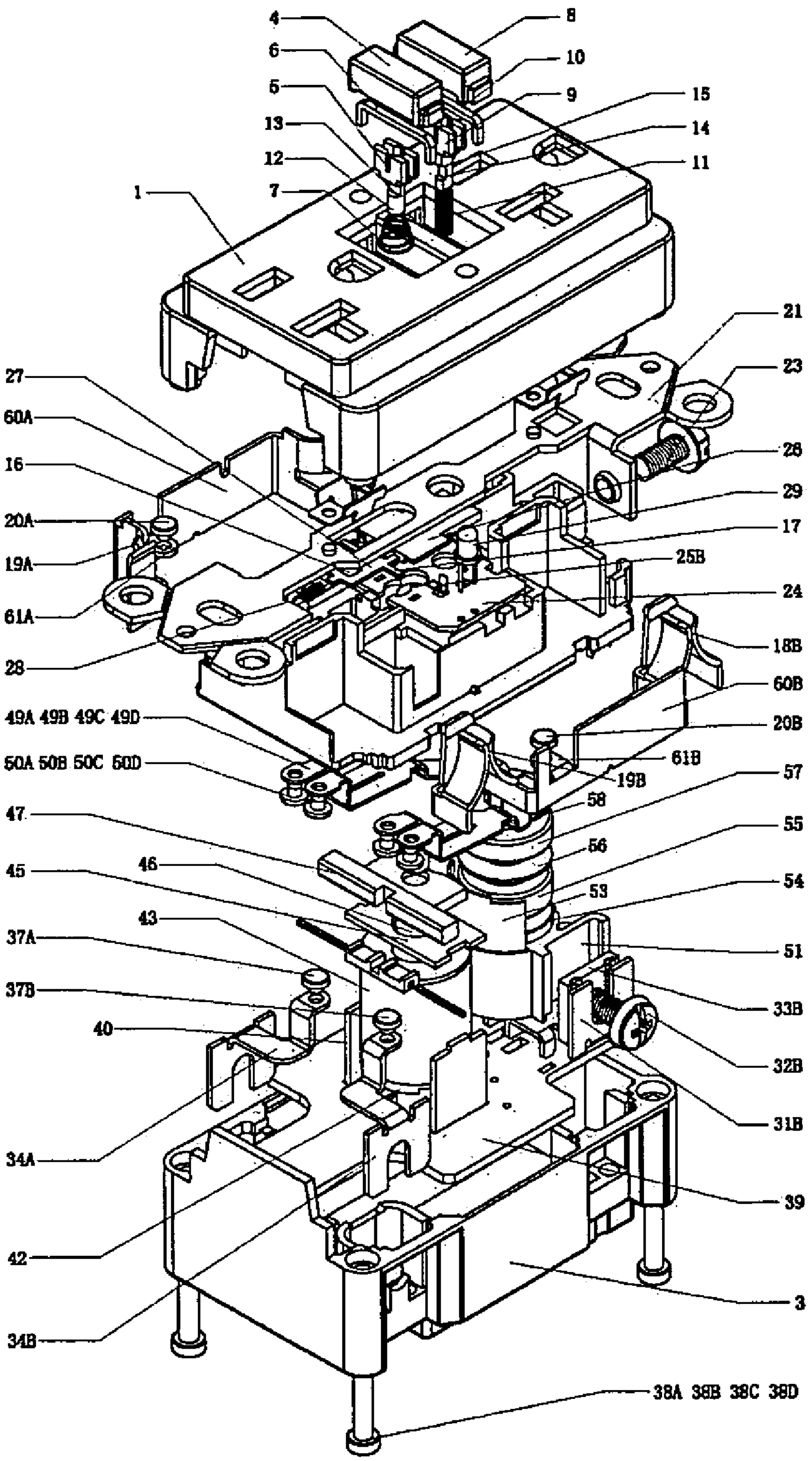
FIG. 1 is an exploded view of a receptacle type GFCI according to an embodiment of the present invention.
Figure 2:
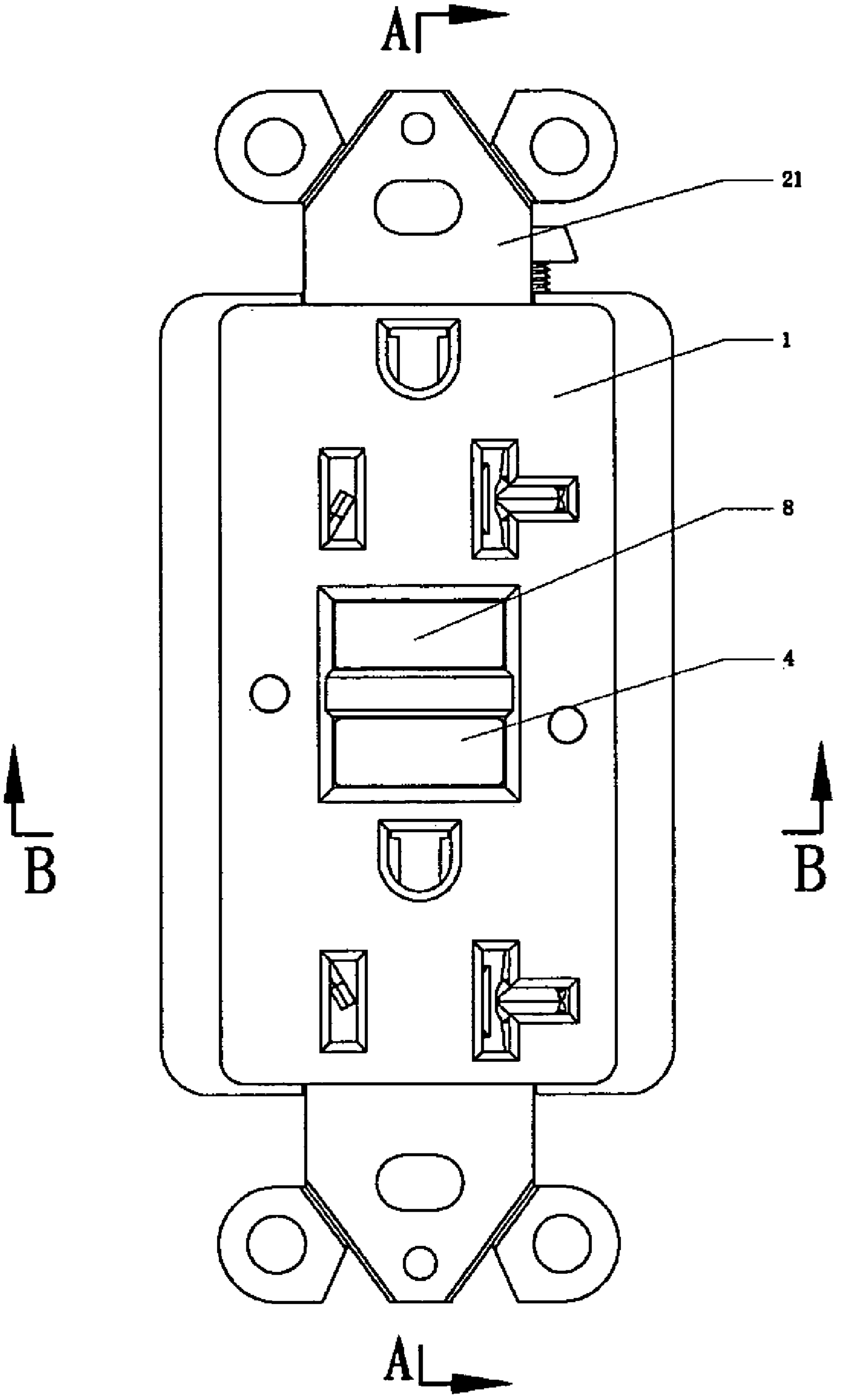
FIG. 2 is a front view of an assembled GFCI shown in FIG. 1.
Figure 3:
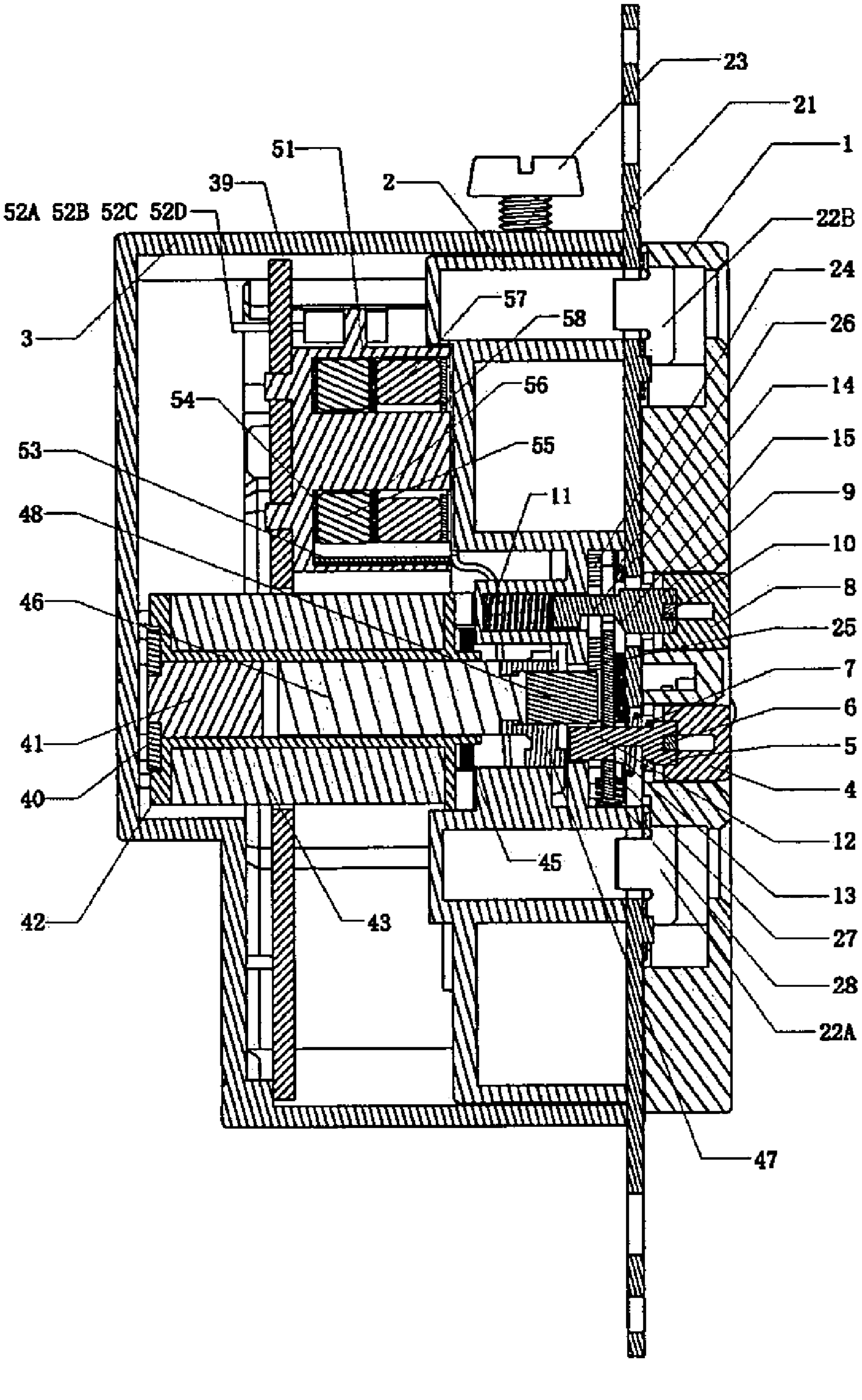
FIG. 3 is a cross-sectional view along the line A-A of FIG. 2 in the tripped state.
Figure 4:
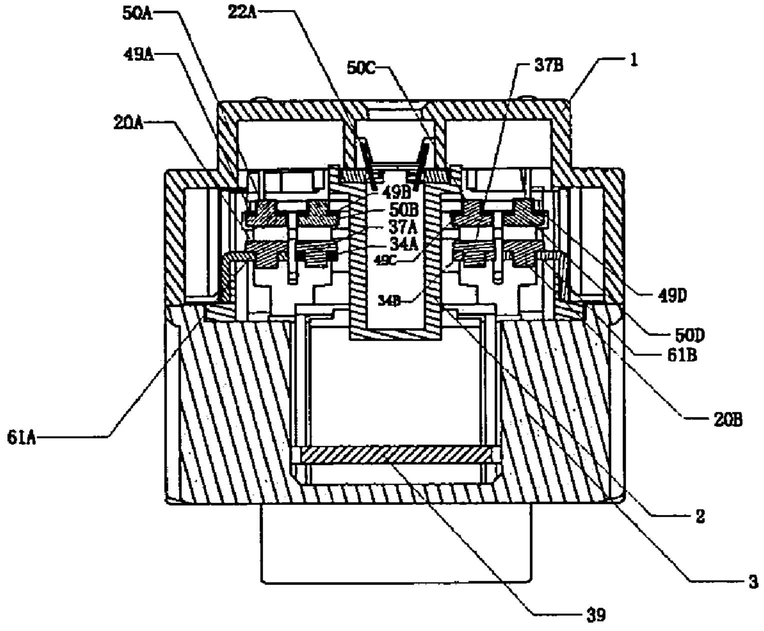
FIG. 4 is a cross-sectional view along the line B-B of FIG. 2 in the tripped state.

As shown in FIG. 3, when the reset button 4 is pressed, the sliding sheet 27 slides into a notch 13 of the ganged switch rod 12 and, under the action of the support spring 28, moves upward along the guide slot of the rail 26. The connecting arm 17 of sliding sheet 27 separate from the two static contact spring sheets 25A and 25B and the ganged switch is open. Then, when the test button 8 is pressed, the sliding sheet 27 moves downward under the action of the inclined surface 15 of the switch push rod 14. The ganged switch rod 12 aligns with the through hole 16 on the sliding sheet 27 and, under the action of the reset spring 7, moves rightward. The sliding sheet 27 moves out of the notch 13, causing the connecting arm 17 to come into contact with the two static contact spring sheets 25A and 25B, closing the ganged switch. In this way, the two connecting arm 17 of the sliding sheet 27 act as contacting tips to contact with and separates from the static contact spring sheets 25A and 25B to realize the closing and opening of the ganged switch.

One end of the normal working condition indicator 29 is connected with the output terminal 34A and the other end is connected to the receptacle outlet 18B or 19B. The normal working condition indicator 29 is used to indicate whether the GFCI is working normally, while the end-of-life indicator 30 is used to indicate whether the GFCI is damaged.

Figure 7:
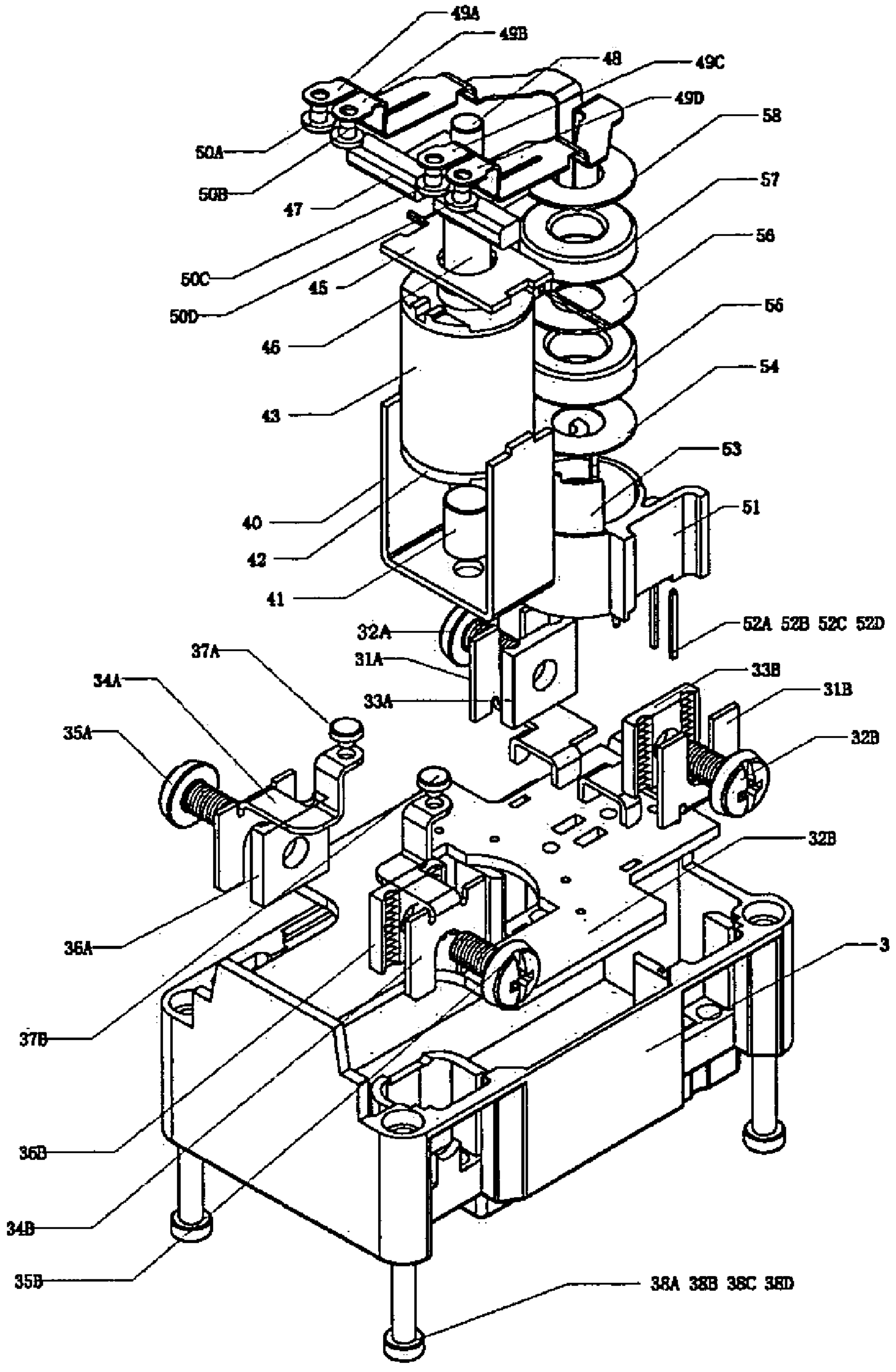
FIG. 7 is an exploded view of the bottom case of the GFCI shown in FIG. 1.

As shown in FIG. 7, the bottom case portion of the GFCI device includes a bottom case 3, assembled screws 38A, 38B, 38C and 38D, a main circuit board 39, input terminals 31A and 31B, input wiring screws 32A and 32B, input wiring pressers 33A and 33B, output terminals 34A and 34B, output wiring screws 35A and 35B, output wiring pressers 36A and 36B, static contact tips 37A and 37B, a ground-fault current detector, and a reset and trip device. The ground-fault current detector includes a magnetic ring sleeve 51, magnetic ring needles 52A, 52B, 52C and 52D made of copper, a shield sheet 53, a pole sheet 54, a Permalloy magnetic ring 55, an isolating paper sheet 56, a ferrite magnetic ring 57 and an insulating paper 58. The reset and trip device includes a coil frame 42, an electromagnetic coil 43, coil frame needles 44A and 44B made of copper, a moveable iron core 46, a moveable contact holder 47, elastic moveable contact sheets 49A, 49B, 49C and 49D, and the reset button assembly. The moveable iron core 46 is placed inside of the electromagnetic coil 43 and the upper end of it is connected to the moveable contact holder 47. A pair of static contact tips 20A, 20B connected to the receptacle outlets and a pair of static contact tips 37A, 37B connected to the output terminals 34A, 34B are disposed at the lower side of the moveable contact holder 47. Two pairs of elastic moveable contact sheets 49A, 49B, 49C, 49D are held by the moveable contact holder 47 and correspondingly disposed above the two pairs of static contact tips 20A, 37A, 37B, and 20B. Two pairs of moveable contact tips 50A, 50B, 50C and 50D made of silver are disposed on the two pairs of elastic moveable contacts 49A, 49B, 49C, 49D and cooperate with the two pairs of static contact tips 20A, 37A, 37B, and 20B. One pair of elastic moveable contacts 49A, 49B, as a unit, pass through the ground-fault current detector to connect to the input terminal 31A, and the other pair of elastic moveable contacts 49C, 49D, as a unit, pass through the ground-fault current detector to connect to the input terminal 31B.

The electromagnetic coil 43 is provided with an electromagnetic coil control circuit, which is connected to the input terminals 31A, 31B. The electromagnetic coil control circuit closes the conducting loop via the reset button assembly, and breaks the conducting loop via the ground-fault current detector, as shown the circuit diagram in FIG. 8.

To increase the attraction force for a more reliable motion of the moveable iron core 46, there may be provided a magnetic steel piece 48 above the iron core 46 and a fixed iron core 41 below the iron core 46. A certain attraction force exists between the magnetic steel 48 and the fixed iron core 41 but it is not sufficient to overcome the spring force of the elastic moveable contact sheets 49A, 49B, 49C and 49D so as to have them reliably contacted with the static contact tips 20A, 20B, 37A and 37B. To increase the magnetic force of the electromagnetic coil assembly, a U-shaped magnetic cover 40 may be provided outside the electromagnetic coil 43 and a magnetic lid 45 may be provided on the top opening of the cover 13. They form a magnetic loop to greatly increase the magnetic force of the electromagnetic coil 43 so as to increase the attraction force applied to the moveable iron core 46 to make the motion more reliable.

The working principle of the receptacle GFCI device is described with reference to FIG. 8. When the wiring is correct and the GFCI device it is turned on (i.e. the ganged switch is closed) for the first time, or when the test button 8 is pressed, a simulated ground-fault loop formed by point E—LED1—S1—Q1—D3—point F performs a ground-fault self detecting function of the GFCI. In case the GFCI is functioning normally, the coil CT in the ground-fault current detector will detect a non-zero value as the sum of the cuffent vector of two of the conductors, and the value will be larger than a threshold for the IC. As a result, the No. 5 pin of the IC quickly outputs a triggering signal, causing the silicon-controlled rectifier SCR1 to work and the transistor Q1 to be off This opens the switches K1, K2, K3 and K4 to put the GFCI in the normal tripped state, and at the same time opens the simulated ground-fault loop to terminate the detecting function. The end-of life indicator LED2 is also off. In this state, if the reset button is pressed, the ganged switch S1 opens, the GFCI will be normally reset and work properly. In case the GFCI is not functioning normally, the light emitting diode LED1 will work for a sufficiently long time period to trigger the photo-sensitive resistor R12, causing the silicon controlled rectifier SCR2 to work and transistor Q2 to be off. This opens the switches K1, K2, K3 and K4, and the end-of-life indicator LED2 turns on to indicate that the GFCI has been damaged and should not be used.

When the GFCI is in the to-be-reset (tripped) state, pressing the reset button 4 will open the ganged switch S1 and at the same time connect points A and B shown in FIG. 8, causing the silicon controlled rectifier SCR1 to stop. When the reset button returns to the original position to disconnect points A and B, the SCR1 remains off, while the transistors Q1 and Q2 are turned on to cause the electromagnetic coil control circuit to conduct. The electromagnetic coil is energized to move the moveable iron core 46. The iron core 46 brings the moveable contact holder 47 downward, and the two pairs of elastic moveable contact sheets 49A, 49B, 49C and 49D bring the moveable contact tips 50A, 50B, 50C and 50D on them downward to come into electrical contact with the pair of static contact tips 20A, 20B and 37A, 37B, respectively. In other words, the switches K1, K2, K3 and K4 shown in the circuit diagram of FIG. 8 are closed, and the GFCI is reset to work and the normal working condition indicator LED3 is lit.

In case of a ground-fault, the coil CT in the ground-fault current detector detects a non-zero sum of the current vector going through its two conductors, and a signal larger than a threshold is applied on the IC. The No. 5 pin of the IC quickly outputs a triggering signal, causing the SCR1 to work. The electric potential at the anode of SCR1 is sufficiently lowered to cause the transistor Q1 stop working, which in turn breaks the electromagnetic coil control circuit. The moveable iron core 46 losses the action force from the electromagnetic coil 43 and, under the elastic action of the elastic moveable contact sheets 49*a*, 49B, 49C and 49D, the moveable contact tips 50A, 50B, 50C and 50D on the elastic moveable contact sheets 49A, 49B, 49C and 49D are separated from the corresponding static contact tips 20A, 20B and 37A, 37B. In other words, the switches K1, K2, K3 and K4 shown in the circuit diagram of FIG. 8 are open, putting the GFCI in a tripped state.

When the input terminals 31A and 31B are reversely wired with the output terminals 34A and 34B, the electromagnetic coil control circuit is powered off since it is connected with the input terminals 31A and 31B. Thus, pressing the reset button 4 will not reset the GFCI normally, i.e., the switches K1-K4 will remain in the open state. As a result, the input terminals 31A and 31B (which are in fact output terminals due to reverse wiring) and receptacle outlets 18A, 18B, 18C and 18D are not powered.

An improved receptacle type GFCI device according to embodiments of the present invention has the following features and advantages.

First, when the GFCI device is correctly wired and the reset button is pressed, the electromagnetic coil control circuit becomes conductive and the moveable iron core, under the action of the coil, brings the moveable contact bridge to move downward. The two pairs of moveable contact tips on the two pairs of elastic moveable contact sheets contact the two pairs of static contact tips to conduct electricity, causing the input terminal to be electrically coupled with the output terminal and the receptacle outlets, whereby the GFCI is put in a normal reset state. When the ground-fault current detector detects a ground-fault current, the electromagnetic coil control circuit opens the loop, and the moveable iron core losses the action force of the electromagnetic coil. The two pairs of moveable contact tips on the two pairs of elastic contact sheets break the connection with the two pairs of static contact tips, whereby the GFCI is put in a normal tripped state. When the input terminals and the output terminals are reversely wired, because the electromagnetic coil control circuit is connected to the in put terminals, the coil is not powered and the GFCI can not be reset normally by pressing the reset button. In the tripped state, because the input terminal, the output terminal and the receptacle outlets are independent of each other, there is no power on the receptacle load end even if the input and output terminals are reversely wired, hence further enhancing the safety of the receptacle GFCI.

Second, during the normal use of the GFCI, if one of the two power wires in the input power (such as the neutral line) is broken or falls off from the input conductors, the reset and trip device will stop working because there is no conductive loop. The connections between the two pairs of moveable contact tips on the two pairs of elastic moveable contact sheets and the two pairs of static contact tips are broken, so that no power is output from the output terminal and receptacle outlets, ensuring safety for the user.

Third, when testing the GFCI device by pressing the test button before using the device, the ganged switch is closed and the simulated ground-fault loop formed by the light emitting diode, the ganged switch and the end-of-life indicator detects ground-fault protection function of the GFCI. If the function is normal, the simulated ground-fault loop becomes open. Pressing the reset button at this time will open the ganged switch and the GFCI can then be normally reset. If, on the other hand, the ground-fault protection function is abnormal, the simulated ground-fault loop will not become open, and the light emitting diode will continue to emit light. The photosensitive resistor receives this signal, and the fault self-detecting control circuit opens control circuit loop for the electromagnetic coil. The connections between the two pairs of moveable contact tips on the two pairs of elastic moveable contact sheets and the two pairs of static contact tips are broken, and there is no power output from the output terminal and the receptacle outlets. The end-of-life indicator also lights up to indicate that this GFCI is no longer working properly, thus ensuring safety for the user.

Although the GFCI device in the above-described embodiment has both a pair of receptacle outlets and output terminals, a GFCI device may have only the outlets or only the output terminals, in which case only one pair of static contact tips, one pair of elastic moveable contacts and one pair of moveable contact tips are needed.

It will be apparent to those skilled in the art that various modification and variations can be made in the receptacle type ground-fault circuit interrupter device of the present invention without departing from the spirit or scope of the invention. Thus, it is intended that the present invention cover modifications and variations that come within the scope of the appended claims and their equivalents.

What is claimed is:

1. A receptacle type ground-fault circuit interrupter device adapted for connecting to input lines, comprising:
- a pair of input terminals for connecting to the input lines;
- a pair of receptacle outlets;
- a ground-fault current detector for detecting a ground fault condition on the input lines;
- a reset and trip device including:
  - a reset button assembly;
  - an electromagnetic coil;
  - an electromagnetic coil control circuit for controlling the electromagnetic coil, the electromagnetic coil control circuit being connected to the input terminals and being closed by the reset button assembly and opened by the ground-fault current detector;
  - a moveable iron core disposed within the electromagnetic coil;
  - a pair of static contact tips electrically connected to the receptacle outlets;
  - a pair of elastic moveable contact sheets mechanically coupled to the moveable iron core and correspondingly disposed adjacent the pair of static contact tips, the pair of elastic moveable contact sheets being electrically connected to the pair of input terminals, respectively, via the ground-fault cuffent detector; and
  - a pair of moveable contact tips disposed on the pair of elastic moveable contact sheets and moveable to make and break contact with the pair of static contact tips; and
- a self detecting and testing structure including:
  - a test button assembly;
  - a light emitting diode;
  - a ganged switch being controlled to close by the test button assembly and to open by the reset button assembly;
  - an end-of-life indicator,
  - wherein the light emitting diode, the ganged switch and end-of-life indicator are connected in series to form a simulated ground-fault loop; and
  - a fault self-detecting control circuit including a photosensitive resistor optically coupled to the light emitting diode, the fault self-detecting control circuit being operable to open the electromagnetic coil control circuit.

2. The receptacle type ground-fault circuit interrupter device of claim 1,
- wherein the reset button assembly includes:
  - a reset button;
  - a reset button accessory mounted on a lower side of the reset button;
  - a ganged switch rod having a notch and connected with the reset button accessory;
  - a reset short-circuit conductor mounted inside of the reset button accessory; and
  - a reset spring disposed at an end of the reset button accessory;
- where the test button assembly includes:
  - a test button;
  - a test button accessory mounted on a lower side of the test button;
  - a switch push rod having an inclined surface and connected with the test button accessory;
  - a test short-circuit conductor mounted inside of the test button accessory; and
  - a test spring; and
- wherein the ganged switch includes:
  - two static contact spring sheets;
  - a rail;
  - a sliding sheet slidably mounted on the rail, the sliding sheet having a through hole corresponding to the ganged switch rod of the reset button accessory and a connecting arm at the center which cooperates with the two static contact spring sheets to provide conductivity, the sliding sheet being disposed against the inclined surface of the switch push-rod of the test button accessory; and
  - a support spring disposed at an end of the sliding sheet near the reset button 4.

3. The receptacle type ground-fault circuit interrupter device of claim 1, further comprising a normal working condition indicator connected at one end to the input terminal and at the other end to the receptacle outlet.

4. The receptacle type ground-fault circuit interrupter device of claim 1, further comprising a magnetic steel piece above the moveable iron core and a fixed iron core below the moveable iron core.

5. The receptacle type ground-fault circuit interrupter device of claim 1, further comprising a U-shaped magnetic cover disposed outside of the electromagnetic coil and a magnetic lid on a top opening of the cover.

6. The receptacle type ground-fault circuit interrupter device of claim 1, further comprising a shell including a face-cover, a middle frame and a bottom case, wherein the a ground-fault cuffent detector, the reset and trip device and the self detecting and testing structure are mounted inside the shell.

7. The receptacle type ground-fault circuit interrupter device of claim 1, further comprising a pair of output terminals, wherein the reset and trip device further includes:

another pair of static contact tips connected to the pair of output terminals;

another pair of elastic moveable contact sheets correspondingly disposed adjacent the other pair of static contact tips and electrically connected to the pair of input terminals, respectively, via the ground-fault current detector; and another pair of moveable contact tips disposed on the other pair of elastic moveable contact sheets and cooperating with the other pair of static contact tips.

8. The receptacle type ground-fault circuit interrupter device of claim 7, further comprising a moveable contact holder connected to an end of the moveable iron core, wherein the pair of elastic moveable contact sheets are held by the moveable contact holder.

* * * * *